3,515,610
METHOD OF FORMING A BAND OF MINERAL FIBERS AND MAKING TUBING FROM SAID BAND
Mauro Comastri and Valentino Wiquel, Milan, Italy, assignors to S.p.A. Vetreria Italiana Balzaretti Modigliani, Milan, Italy, an Italian corporation
Filed June 4, 1968, Ser. No. 734,346
Claims priority, application Italy, June 10, 1967, 17,077/67
Int. Cl. B32b *17/04*
U.S. Cl. 156—62.8                       14 Claims

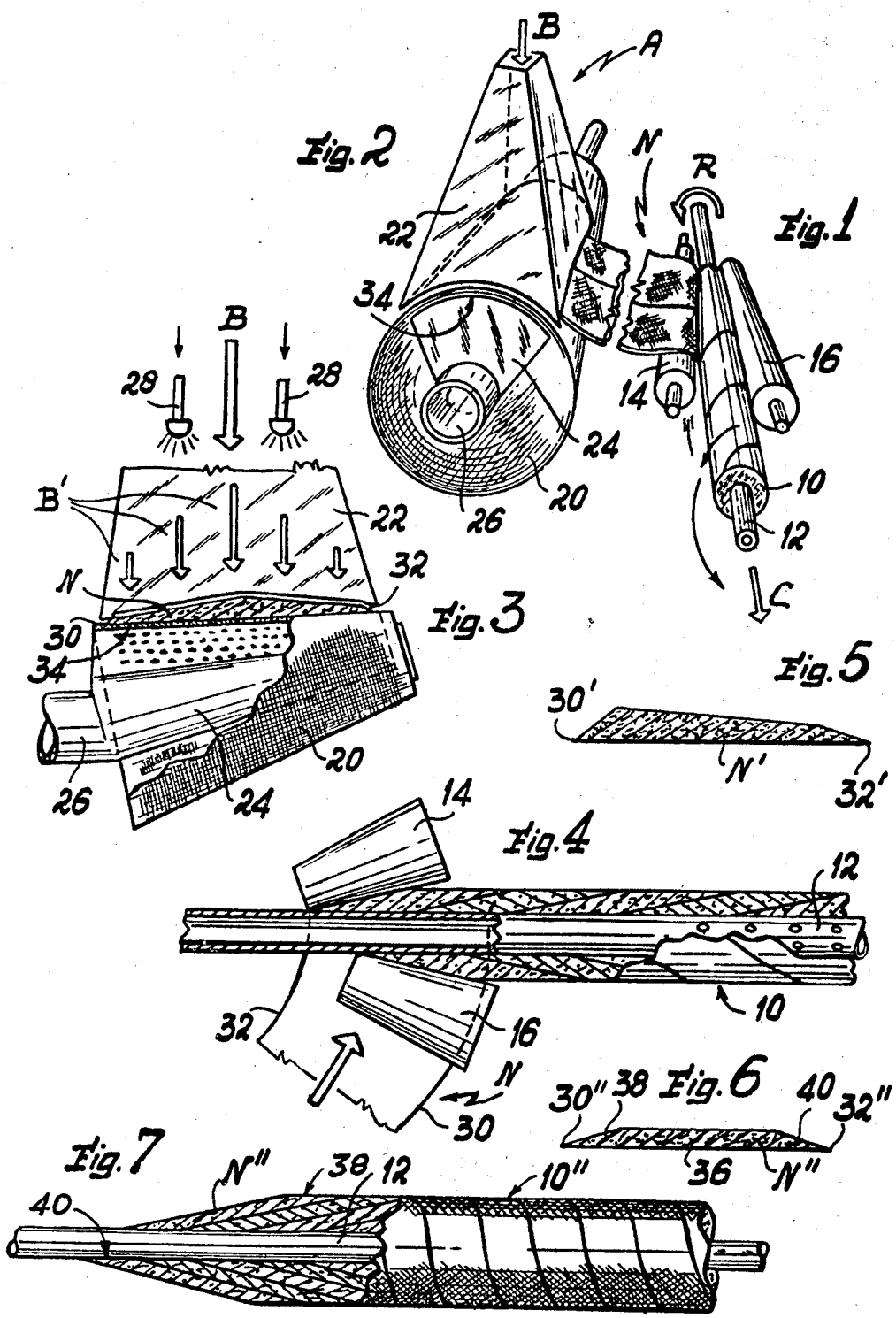

ABSTRACT OF THE DISCLOSURE

The continuous production of a conglomerated band of mineral fibers, such as glass fibers, adapted to be wound on a rotary mandrel in partially superposed spirals to form continuously heat-insulating cylindrical tubing which is withdrawn axially from the mandrel, said band being formed by the deposition of the raw mineral fibers onto a movable foraminous collecting surface, such as a rotary truncated conical member, which advances the formed mat at different linear velocities along the width thereof, thereby initially imparting to the band a curvature in the plane thereof, which may be increased by a supplemental deformation, and which facilitates the laying up of the successive spirals on the mandrel. By varying the thickness of the band along its width, smooth cylindrical surfaces may be obtained on the exterior and interior of the cylindrical tubing.

---

The present invention relates to improvements in the procedures and equipment for the continuous production of tubular products from fibrous materials, and more particularly from felts of artifiical fibers, such as glass fibers or other similar mineral fibers, and which are designed principally for use in the formation of heat-insulating sheathing for cylindrical bodies, such as tubes, conduits and the like.

The present invention also has for its purpose the perfecting of industrial equipment for executing the improved process.

In our U.S. application Ser. No. 576,586, filed Sept. 1, 1966, we have disclosed and claimed a method for continuously producing cylindrical tubing from a mat or felted band of mineral fibers, of predetermined width, which is subjected to a differential stretching over the width thereof, so that the linear stretching of the opposite edges of the band cause them to assume a ratio very close to the ratio existing between the interior and exterior diameters of the cylindrical tubing being produced. In other words, the band is subjected to a differential stretching under the effect of which, the band, which is originally of uniform thickness and with rectilinear parallel edges, assumes a predetermined curve in its own plane. The band, thus deformed, is then wound helicoidally or spirally around a suitable mandrel, in spiral steps which neatly superpose the adjacent spirals so that the edges of longer and lesser length of the band, which has been deformed in its own plane as described above, define the external and internal diameters of the coiled product which is constituted by the successive cylindrical coils having these diameters. Reference may be made to the above-mentioned U.S. application, Ser. No. 576,586, for further details of the method generally described above, on which the instant invention constitutes a further development and improvement.

The above-mentioned application described and claimed an apparatus and an installation for the execution of the above method and the continuous manufacture of tubular products of the type and for the purposes set forth above. This apparatus, for the details of which reference may be made to the above-mentioned disclosure, comprises the following combined elements:

(a) Stretching means adapted to exert a differential action on a felt band or mat of uniform width, to cause a deformation of the band in its own plane, in particular a differential elongation across the width of the band, and (b) Means for presenting and winding the band thus deformed around a suitable mandrel, and under such conditions of inclination with respect to the axis of winding, that each spiral resulting from the winding, presents a frustoconical configuration, and for the main part superposes the immediately preceding coil, which in practice amounts to at least more than half the width of the band.

Consequently, the conditions and means contemplated in the above-mentioned earlier disclosure presuppose the existence of a rectilinear band of fibrous felt to be deformed and to be wound successively under the particular conditions above indicated, and described in greater detail in these disclosures.

The improvement in accordance with the instant invention contemplates the industrial manufacture of tubular fibrous products by spirally winding a felt band, which is not rectilinear under the indicated conditions, and the invention presents the possibility of producing this band directly under these conditions of deformation, or at least under conditions of partial deformation in a direction conforming to the direction of winding, which constitutes the characteristic of the earlier procedures, as disclosed in the above-mentioned application. In other words, the present improvement involves the complete or partial replacement of the differential stretching phase by a phase of direct formation of the band under the same conditions or at least under conditions close to those necessary for the realization of said spiral winding. By the expression "close to the necessary conditions" is meant conditions in which the produced band is not rectilinear, but is deformed in the direction which renders it suitable for the winding in question, that is, a state of deformation which may be incomplete or insufficient, and therefore possibly requiring an additional cumulative differential stretching treatment, but a less severe one than the treatment necessary to prepare an originally rectilinear band for the winding operation.

Conforming to one complementary characteristic of the improvement, the fibrous felt band, instead of having a uniform thickness over its whole width, is manufactured with variable thicknesses over the whole or part of its width, so as to impart to said band transverse sections which are more correctly superposable during the spiral winding in question.

The improved equipment making possible the execution of the process in accordance with the invention and constituting another object of the present invention, is characterized essentially by the fact that it comprises a combination of means for the formation and the continuous supply of a non-rectilinear fibrous felt band, and means for winding this band to attain a continuous production of the tubular product, conforming in essence to the above-mentioned earlier disclosure, which is improved more particularly by the most favorable conditions for continuous production arising from the cross-sectional configuration of the band which is obtained by the above-mentioned methods. This combination does not exclude the band, in the course of its travel from its forming station to its winding station, from being subjected to an auxiliary action of differential stretching, and/or smoothing, or modification of its cross-section and/or its curvature in its own plane.

Other objects, purposes and characteristics of the invention above, will appear from the more detailed description following hereinafter, taken in conjunction with the accompanying drawings, illustrating different embodiments thereof, and wherein FIGS. 1 and 2 are perspective views, in simplified form, of one embodiment of the invention having a spiral winding means similar to the earlier disclosure, to which is fed a ribbon or band of fibers which is not straight along its length and is of varying cross-section across its width, as produced by the apparatus shown in FIG. 2;

FIG. 3 is a partial longitudinal section of FIG. 2, with certain parts in elevation, of the apparatus illustrated in FIG. 2, for the formation of the felt band of fibers;

FIG. 4 is a vertical sectional view, with some parts in elevation, of a winding apparatus of the type shown in FIG. 1, for producing a fibrous tubular product from a band having a cross-section corresponding essentially to that shown in FIG. 3;

FIG. 5 is a cross-section of a variant of the fibrous band, which is particularly suitable for the application of an intermediate differential stretching treatment for the purpose of preparing the band for winding;

FIG. 6 shows the cross-section of another embodiment of a tape or band which is produced by differentially stretching the band of FIG. 5, or directly by a device of the type shown in FIGS. 2 and 3, suitably modified; and FIG. 7 is a sectional view, partially in elevation, of a fibrous tubular product obtained essentially according to the principle of the earlier disclosure by using a felt band having a cross-section of the type shown in FIG. 6.

As may be seen in the drawings, FIG. 1 represents a device for forming a fibrous tubular product 10 around a rotating mandrel 12, which also experiences a progressive forward movement in the direction of its length along its axis C, which is associated with the rotary movement, indicated by the arrow R, in order to form the desired spirally wound structure, which is characteristic of the invention in the above-mentioned disclosure. This device, in addition to the frusto-conical rollers 14 and 16, which serve to wind and compress, comprises traction means acting along the axis of the product, means for imparting rotary movement to the mandrel, heat treating means for the wound fibrous mass, possibly means for covering the tubular product, and others, all conforming to the arrangements disclosed in the above-mentioned application. The formation of the tubular product requires that the apparatus be previously supplied with a band N of felt, having a curvature in its own plane, such that the ratio between the linear dimensions of its inside and outside edges resulting from its curvature, is of the same order as the ratio between the inner and outer diameters, respectively, of the tubular product 10 which is produced in accordance with the earlier disclosure.

According to the improvement, in order to assure the supply of the band N, a device A (FIG. 2), is used which is capable of producing the band N continuously, in a condition which renders it ready for the execution of the winding operation, or at least in such conditions of longitudinal progression and/or transverse cross-section, which are proximate to the necessary condition for winding.

As FIGS. 2 and 3 show, this device A may comprise, for example, a truncated conic roller 20 of perforated sheet metal, wire netting or other perforated material, capable of constituting a traveling surface moving in continuous fashion, onto which is deposited fibers to form the felt band or ribbon continuously and progressively, the conicity of said roller 20 determining the curvature of the fabricated band in its own plane.

In practice, the air-permeable area of the rotary roller 20 corresponds functionally to that of the carrier belts or the surfaces of formation, in any fashion, of the fibrous felts or band, as is currently known in this branch of technology. However, there is this difference: due to the conicity of the roller, the peripheral speeds of the surface different points along the length thereof, are different at different points, which cause the formation of a warped and incurved band in its own plane. The radius of curvature may obviously be determined at will, by the choice of conicity of the roller.

The fibrous material, fabricated in known manner, is brought to the surface of the roller 20 in suspension in a gaseous stream or flux, for example, by means of a hood 22 into which the flux enters from the direction B, the gaseous phase of the flux being sucked or drawn into the inside of the roller 20, by means, for example, of a suction funnel 24, which may communicate with a suitable suction device (not shown) through a coupling 26. This equipment may be advantageously completed by known means, for example, by atomizers 28 to introduce, in uniform or differential fashion, the binding agents necessary to give the fibrous product its firmness, and possibly the filler materials, and the additives and other similar materials, according to the techniques known in the art.

The use of this device, or an equivalent device, thus permits obtaining a band N which, as a function of the conicity of the roller 20, has opposite edges 30 and 32 of different development, in a ratio in accord with, and possibly equal to, that existing between the maximum and minimum diameters, respectively, of the tubular product 10 to be fabricated, so that the band may be directly wound onto the forming mandrel under conditions described in the above-mentioned disclosure. If these ratios, although concordant, are different from one another, there may be interposed between the device of FIG. 1 and the device of FIG. 2, a differential stretching means, of the type described in the above-mentioned disclosures, but functioning so as to obtain a simple, and in particular, a limited increase in the deformation of the band, which is cumulative of distortion in the direction of its width. This possibility can be advantageously exploited to adapt the entire device to the production of tubular products of varied dimensions, without changing the band producing equipment A.

In addition, the operation and utilization of a device such as analyzed above, or equivalent, give rise to a considerable further advantage, following from the fact that with such equipment, it is possible to produce a felt band N which may be differentiated in the direction of width not only in the longitudinal development of its margins, but also in its thickness. This possibility gives rise to felt bands adapted to function under particularly favorable conditions, in the formation of the product, one example of which is shown in FIGS. 3 and 4.

In this case, for example, as may be seen in FIG. 3, the band N of felted fibers presents a cross-sectional configuration essentially of a very flattened isosceles triangle, the desired differentiation of longitudinal development between the opposite edges 30 and 32 remaining fixed. Beginning with this configuration and by means of a negligible transverse deformation, a configuration can be obtained with a section having essentially the shape of a parallelogram an elongated diamond-shaped lozenge, as may be seen in FIG. 4. In this case, by advantageously adapting the winding pitch, a perfect superposition of successive spirals is obtained, corresponding to the oblique faces of the lozenges formed by the sections of these spirals, while the surfaces parallel to the winding axis serve to form the inner and outer surfaces of the product 10 itself, surfaces which consequently are perfectly cylindrical, without need for successive flattening, trimming or other treatments.

This difference in thickness can be obtained preferably by varying the amount of fibers deposited on the surface of the roller 20, for example, as is indicated schematically by the different lengths of the arrows B' which, in FIG. 3, indicate the extent of the localized flow of fibers arriving on the surface of this roller. The variations, or even the deposits of the fibers, according to a differentiated selection, may be obtained in different ways. For example, the supply of the fibers to the inside of hood 22 may be controlled by means of an appropriate diaphragm system, and/or by a variable selective action of the suction blowers at different portions of the roller 20.

Assuming that the flux which carries the fibers in suspension is chiefly controlled by the reduced pressure applied and maintained in the suction funnel 24, the differentiation is principally governed by a corresponding differentiation of the call for air at different points of the length of this suction funnel. As is shown in FIG. 3, this funnel presents a truncated conic sector on its surface 34, adjacent to the inside of the perforated roller 20, with several holes of different diameter and/or situated at variable distances from one another, so as to obtain the desired ventilating air effects locally, which are different from those realized at other points of the funnel, which in a measure serve to vary locally the quantity of fibers which are deposited. Diaphragms or movable plates may be arranged in advance in order to obtain a variation and/or a more precise control of the differential air effects of the air stream which carries the fibers onto the surface of the roller 20 for the formation of the felt band.

The production of a product such as shown in FIGS. 3 and 4 presupposes that either the winding is to be done according to a spiral having a path or pitch equal to half the width of the felt band N, or that the band-producing device A is capable of furnishing the band with the desired section and curvature. On the other hand, where there is the intention of subjecting the band produced to a corrective and/or complementary or cumulative differential stretching, the possibility described above, of differentiation in the thickness of the original band, can be taken advantage of to give the band a greater thickness in the zones where it will be more sharply acted upon by the differential stretching. A felt band of this kind is shown in FIG. 5 with the designation N'. As can be seen, this band has a thickness which increases progressively from the edge or from a point near the edge 32' toward the opposite edge 30', while assuming obviously that the differential stretching will cause a greater lengthening of the portions adjacent to the latter.

A complementary treatment of this type consequently permits the result of the formation of a band N'' of the type shown in FIG. 6, of generally flat isosceles trapezoidal section, which comprises a central part 36 of uniform thickness and marginal parts 38 and 40 sloping from the central portion and merging with the base at the edges 30'' and 32'', respectively. It is evident that a felt band of such section can be produced directly with the forming device A, if the latter is capable of imparting the required curvature to the band in its own plane.

This same FIG. 6, when examined together with FIG. 7, illustrates a modified embodiment of the fibrous tubular product indicated by numeral 10'', which is characterized by the spiralled winding determining the superposition of adjacent spirals, a superposition which involves the major width of the band and certainly more than half thereof. The slight lateral walls of the band control the formation of a helicoidal spiral of a pitch equal to the width of said marginal parts 38 and 40. In this case, in fact, the wound band presents the cross-section of the spiral in the form of a parallelogram configuration, in which the truncated portions at the marginal edges constitute the inner and outer surfaces, respectively, of the tubular product, always attaining the desired coplanar condition of the cylindrical surfaces and the smoothness of these surfaces.

We claim:
1. The method of continuously producing cylindrical tubing from a conglomerate mass of mineral fibers, which comprises
   (a) forming a band of said fibers for immediate winding thereof spirally onto a rotary mandrel with the successive spirals of the width of the band superposing the preceding ones at least in partially overlapping relation, and axially removing the formed cylindrical tubing from the mandrel,
   (b) said band being formed continuously from the raw mineral fibers by depositing them on a collecting surface and imparting to the deposited band, at its origin, a curvature in its own plane and a consequent differential in the length of the opposite edges of said band,
   (c) the shorter one of said edges being wound in contact with the mandrel while the opposite longer edge is proximate to the outer surface of said cylindrical tubing.

2. The method set forth in claim 1 wherein the ratio of the longer and shorter edges of the band corresponds substantially to the ratio of external and internal diameters of the cylindrical tubing.

3. The method set forth in claim 1 wherein the ratio of the longer and shorter edges of the band of deposited fibers at its origin is less than substantially the ratio of the external and internal diameters of the cylindrical tubing, said method including the step of stretching the band differentially across its width in the course of its travel to the rotary mandrel to bring said ratios into substantial accord.

4. The method set forth in claim 1, including the step of depositing the raw fibers onto the collecting surface in a layer of varying thickness across the width of the band.

5. The method set forth in claim 4 wherein the spiral winding of the band of varying thickness disposes the surfaces thereof adjacent to its edges within the cylindrical planes of the external and internal surfaces of said tubing.

6. The method set forth in claim 3, including the step of depositing the raw fibers onto the collecting surface in a layer of varying thickness across the width of the band, the greatest depth of said band being disposed proximate to the portion of the band which is subjected to the greatest degree of stretching.

7. The method set forth in claim 4 wherein the deposited layer is of maximum thickness at approximately the central portion of the band and decreases towards the edges, so that the surfaces adjacent the latter, in the wound condition of the spirals, conform smoothly to the cylindrical outlines of the external and internal surfaces of said cylindrical tubing.

8. The method set forth in claim 7, wherein the sections of the successive wound spirals on the mandrel are in the form of parallelograms.

9. The method set forth in claim 7, wherein the deposited layer of fibers has a section of a flat isosceles triangle which upon the winding of the resulting band onto the mandrel lays up the successive spirals in a manner resembling diamond-shaped lozenges.

10. The method set forth in claim 7 wherein the deposited layer of fibers has a section of a flat isosceles trapezoid, which upon the winding of the resulting band onto the mandrel lays up the successive spirals so that the side of the trapezoid along the long edge of the band defines the outer surface of the cylindrical tubing, while the base of the trapezoid below the other side thereof at the shorter edge of the band defines the inner surface of the cylindrical tubing.

11. The method set forth in claim 4 wherein the deposited layer is of trapezoidal section composed of a central section of substantially uniform depth with end portions of triangular section merging with the base, said end portions adapted to conform smoothly to the cylindrical planes of the external and internal surfaces of said cylindrical tubing.

12. The method set forth in claim 11 wherein the fibrous band is wound onto the rotary mandrel at a pitch of approximately one-half the width of the band.

13. The method set forth in claim 11 wherein the fibrous band is wound onto the rotary mandrel at a pitch which winds the portion of the base of the trapezoid below the side thereof along the shorter edge of the band onto the mandrel while the rest of the base of the band superposes the preceding spiral.

14. The method set forth in claim 1 wherein the formed band of fibers is permeated with a binding agent and including the step of heat treating the wound band on the mandrel prior to the delivery of the cylindrical tubing therefrom, to effect a setting of the binding agent.

References Cited

UNITED STATES PATENTS

| | | | |
|---|---|---|---|
| 2,500,282 | 3/1950 | Francis | 156—62.8 XR |
| 3,093,532 | 6/1963 | Miller et al. | 264—128 XR |
| 3,226,273 | 12/1965 | Becker | 156—195 |
| 2,906,317 | 9/1959 | Keyes | 264—119 XR |
| 2,884,010 | 4/1959 | Fischer | 138—144 |

PHILIP DIER, Primary Examiner

U.S. Cl. X.R.

138—144; 156—189, 195, 196, 229; 264—119, 128, 288